Feb. 7, 1950  V. S. LA ROSA ET AL  2,496,548
MACARONI WEIGHING MACHINE
Filed April 13, 1948
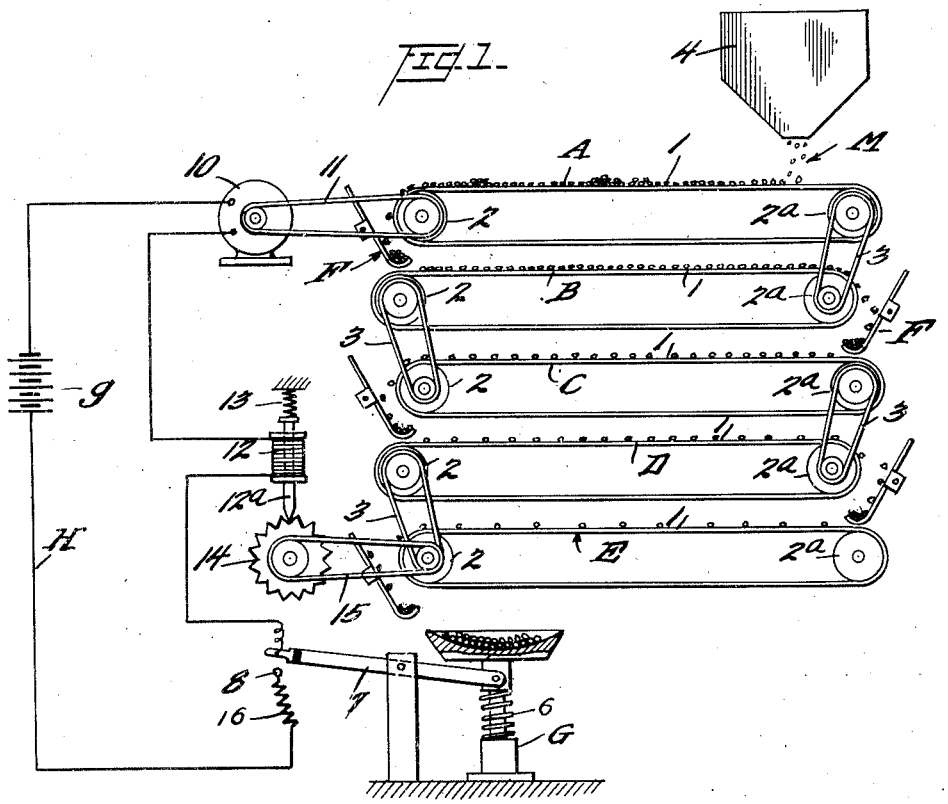
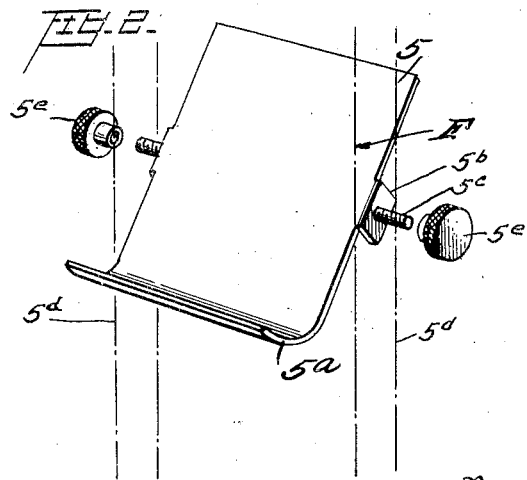
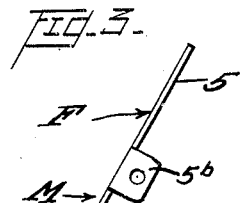
Inventors
Vincent S. LaRosa
John Shields
Robert E. Bernier
By Eugene H. Purdy
their Attorney Patented Feb. 7, 1950

2,496,548

UNITED STATES PATENT OFFICE 2,496,548

MACARONI WEIGHING MACHINE

Vincent S. La Rosa, John Shields, and Robert E. Bernier, Danielson, Conn., assignors to V. La Rosa & Sons, Brooklyn, N. Y., a corporation of New York Application April 13, 1948, Serial No. 20,628

3 Claims. (Cl. 198—39)

This invention relates to weighing machines suitable for use in the packaging of dry macaroni sticks or similar articles in which the macaroni is continuously discharged from a hopper onto a conveyor, which latter automatically arranges the sticks in parallel spaced-apart relation and finally delivers them into a weighing receptacle which is so constructed and arranged as to automatically stop the conveyor after the delivery of a predetermined amount of macaroni.

An important object of our invention is to provide a weighing machine of the above character having a plurality of belts moving at progressively faster speeds, a transfer plate for directing the sticks of macaroni from one belt to the next in such manner that the macaroni sticks sliding down the transfer plate fall into a pocket at the lower end of the plate and automatically orient themselves in a direction parallel to and crosswise of the adjacent conveyor belt before being ejected thereonto by succeeding sticks of macaroni following down the plate.

Another object of our invention is to provide in a weighing machine of the above character, means for gently feeding the sticks of macaroni into the weighing receptacle at relatively widely spaced intervals and for instantly and automatically stopping the travel of the conveyor when a predetermined quantity of macaroni has been delivered into the receptacle.

Other objects and advantages will be apparent from the following detailed description of a preferred embodiment of the invention, reference being had to the annexed drawings in which:

Figure 1 is a diagrammatic sketch of a weighing machine for measuring out predetermined amounts of macaroni preparatory to packaging;

Figure 2 is a perspective view of one of the transfer plates for directing the sticks of macaroni from one conveyor onto another located immediately therebelow; and Figure 3 is a side view of the transfer plate of Figure 2, indicating the manner in which the sticks of macaroni are directed downwardly therealong.

The macaroni weighing machine diagrammatically shown in Figure 1 comprises in general a conveyor assembly including a series of horizontal belt conveyors A, B, C, D and E, located one above the other, transfer plates F positioned at the discharge ends of the conveyors for directing the sticks of macaroni M onto the next lower conveyor, a weighing receptacle G at the discharge end of the lowermost conveyor for receiving the macaroni leaving that conveyor, and an electrical circuit H for supplying power to a motor for driving the conveyors and including control mechanism for instantly stopping the travel of the conveyors when a predetermined quantity of macaroni has been delivered to the weighing receptacle.

Considering now the weighing machine in greater detail, each of the conveyors A, B, C, D and E comprises a belt 1 winding over a pair of horizontally spaced-apart rollers 2 and 2a, the rollers of the several conveyors being drivingly coupled together by transmission chains 3 extending between sprockets associated with the rollers in a manner such that alternate belts travel in opposite directions, each belt moving at a greater speed than the preceding one from the top conveyor downwardly. Thus, the sprockets engaged by the chains 3 may be suitably chosen so that the belt of the top conveyor A normally travels at a speed of 10 feet per minute; the second conveyor B at 20 feet per minute; the third conveyor C at 30 feet per minute; the fourth conveyor D at 40 feet per minute, and the fifth conveyor E at 50 feet per minute. The macaroni is fed from a hopper 4 so that the sticks fall haphazardly onto the upper flight of the top conveyor A and may lie more or less bunched closely together, as indicated in Figure 1.

The transfer plates F located at the discharge ends of the conveyors are made of sheet metal. As best shown in Figures 2 and 3, the major portion 5 of this plate is flat, or approximately flat, and extends between adjacent conveyors at an inclination to the horizontal so as to constitute a slide down which the macaroni is directed from the discharge end of one conveyor to the receiving end of the next conveyor. The idea of spacing articles apart by successively passing them onto belts traveling at progressively greater speeds is not new and no claim for novelty is made for this feature alone of the conveyor construction.

At is lower end each transfer plate 5 is curved to form an upturned lip 5a which defines a shallow pocket. Integral with the transfer plate and downturned from opposite sides thereof approximately midway of its length are ears 5b having aligned openings so as to pass a supporting rod 5c affixed to the underface of the plate and extending horizontally between and rotatably mounted in uprights 5d, (indicated in phantom lines). The ends of the rod are screw-threaded to receive nuts 5e which nuts may be clamped against the uprights to frictionally retain the transfer plate in its angularly adjusted position.

During the operation of the machine these pockets 5a retain momentarily at rest the individual sticks of macaroni M (as best indicated in Figure 3) and orient the sticks relative to the conveyor belt onto which they are about to pass. Each stick is ejected from the pocket onto the conveyor belt by a light tap imparted thereto by a succeeding stick of macaroni sliding down the transfer plate.

After completing the path of the conveyor, the macaroni is chuted from the lowermost conveyor E by means of another transfer plate F into the weighing receptacle G. The weighing receptacle is mounted so that as it moves downward against the pressure of a spring 6 as the weight of macaroni in the receptacle increases and swings a pivoted switch arm 7 which, in one extreme position of its movement, rides off the contact 8 and opens the electrical circuit H. The circuit H includes a suitable source of current 9 and a motor 10 drivingly coupled to the top conveyor A through a transmission chain 11. The circuit also includes a solenoid 12 for holding an armature 12a retracted against the pressure of a spring 13. When the solenoid is released the spring urges it in a direction such as to engage between the teeth of a star wheel 14. The star wheel is mechanically coupled to a roller 2 of one of the conveyors by a chain 15 so as to rotate in consonance with the roller. Thus, when the circuit is opened, the solenoid becomes inoperative and the spring 13 urges the end of the armature into locking engagement with star wheel 14 to instantly stop the travel of the conveyors.

To avoid imposing too great a shock upon the conveyor mechanism, when it is brought to a stop, we provide in the motor circuit H resistance 16 adapted to be traversed by the switch arm 7 preliminary to opening the circuit, thus causing the motor to slow down the speed of the conveyor just prior to its stopping.

The electrical circuit illustrated is simply schematic and manifestly may be embodied in other forms such as are within the skill of an electrician. For example, in place of the locking action of armature 12a and the star wheel 14, electromagnetic brakes may be employed.

In the operation of the weighing machine just described, the sticks of macaroni fall from the hopper 4 upon the belt of the conveyor A so as to lie in haphazard arrangement thereon; this conveyor carries the macaroni along at a comparatively slow speed and drops it off the end of the belt onto the transfer plate F. The sticks of macaroni sliding down the conveyor plate are directed onto the reversely and faster traveling belt of conveyor B. At the end of the conveyor B the macaroni is directed by another and similar transfer plate F onto the reversely traveling conveyor belt C, which latter belt has a slightly greater speed than belt B. In this way the sticks of macaroni passing from belt to belt, each belt traveling at a faster speed than its predecessor, are spread farther and farther apart, being finally discharged from the lowermost belt E, via the transfer plates F, into the weighing receptable G. Because of the haphazard and non-uniform feed of macaroni from the hopper 4, there may result a bunching of the sticks as they travel along the first few conveyor belts. However, as the macaroni sticks continue their progress they will become spread farther and farther apart due to the increasing speeds of the several conveyor belts and any bunching of the sticks that may occur in the pockets of the transfer plates F during the initial stages of travel will disappear by the time the macaroni reaches the final conveyor or conveyors.

As the sticks of macaroni slide down the inclined transfer plates F they come to rest momentarily within the pocket 5a at the lower end of the plate and automatically position themselves parallel to and crosswise of the surface of the adjacent belt. Several sticks lying side-by-side may fill a pocket at the same time so that as a succeeding stick slides down the transfer plate it strikes the row of parallel arranged sticks already contained within the pocket and imparts a gentle tap thereto so as to nudge the leading stick over the lip 5a onto the adjacent conveyor belt (or into the weighing receptacle). In this way the individual sticks are gently deposited one after another in orderly parallel arrangement upon the final conveyor E and thence into the weighing receptacle.

The slope of the transfer plates F and the distance of their pockets above the respective conveyor belts will be suitably adjusted so as to give the best results; and for sticks of relatively light materials, such as macaroni, this slope will ordinarily lie in the neighborhood of 60 degrees to the horizontal. While we have shown the transfer plates as flat except for the terminal lip 5a, these plates may be made slightly concave if desired without departing from the principle of our invention.

As the macaroni sticks continue to pour into the weighing receptacle, the increasing weight of the macaroni lowers the receptacle against the weight of the spring 6 and thus swings the switch arm 7 about its pivot. When the quantity of macaroni in the weighing receptacle approaches that required to fill a package, the arm 7 first operates to cut the resistance 16 into the electrical circuit E to slow down the motor 10—and hence the speed of the conveyors driven by this motor—and subsequently to open the circuit and stop the motor.

Simultaneously with the opening of the circuit, the solenoid 12 is de-energized and allows the armature 12a to be projected by the spring 13 into locking engagement with the star wheel 14, instantly bringing the conveyors to a halt. Because of the parallel spread-apart disposition of the sticks of macaroni on the lowermost conveyor E, when the weighing receptacle opens the circuit the conveyor drive is stopped sufficiently quick to prevent delivery of excess macaroni into the weighing receptacle, as a consequence of overrunning of the conveyor, which would result in packages of non-uniform content.

While a preferred specific embodiment of the macaroni weighing machine of our invention has been set forth, it is to be understood that the invention is not limited to the exact constructions illustrated and described, but modifications of these details may be made within the purview of the appended claims.

We claim:

1. In a weighing machine for dry macaroni sticks and the like, a plurality of horizontal conveyors located one below the other and adapted to travel at progressively faster speeds, a transfer plate positioned adjacent the discharge end of one of said conveyors, said transfer plate being disposed at an inclination to the horizontal for intercepting the sticks leaving last said conveyor, and a shallow pocket provided at the lower end of said transfer plate for interrupting the travel and orienting the sticks preliminary to their discharge from said transfer plate.

2. In a weighing machine for dry macaroni sticks and the like, a plurality of horizontal conveyor belts located one below the other and adapted to travel at progressively faster speeds and a weighing receptacle positioned below and adjacent the lowermost conveyor belt, a transfer plate intermediate the lowermost conveyor belt and weighing receptacle, said transfer plate being disposed at an inclination to the horizontal for intercepting the sticks leaving the lowermost conveyor and directing them into the weighing receptacle, and a shallow pocket provided at the lower end of said transfer plate for interrupting the travel and orienting the sticks preliminary to their discharge into the weighing receptacle.

3. In a weighing machine for dry macaroni sticks and the like, a series of horizontal conveyors located one below the other, an electric motor for driving said conveyors at progressively faster speeds and a weighing receptacle positioned below and adjacent the lowermost conveyor, a transfer plate intermediate the lowermost conveyor and the weighing receptacle, said transfer plate being disposed at an inclination to the horizontal for intercepting the sticks leaving the lowermost conveyor and directing them into the weighing receptacle, said transfer plate having a shallow pocket at its lower end for interrupting the travel and orienting the sticks preliminary to their discharge into the weighing receptacle, and control mechanism operable by the weighing receptacle for stopping the conveyor drive.

VINCENT S. LA ROSA.
JOHN SHIELDS.
ROBERT E. BERNIER.

REFERENCES CITED

The following references are of record in the file of this patent:

UNITED STATES PATENTS

| Number | Name | Date |
| --- | --- | --- |
| 1,297,926 | Starr | Mar. 18, 1919 |
| 1,457,352 | Dreher | June 5, 1923 |
| 1,777,670 | Hausman | Oct. 7, 1930 |
| 1,798,711 | States | Mar. 31, 1931 |